United States Patent Office 2,830,970
Patented Apr. 15, 1958

2,830,970

VULCANIZATION OF BUTYL RUBBER BY 2,6-DI(ACYLOXYMETHYL) - 4 - HYDROCARBYL PHENOLS

Pliny O. Tawney, Passaic, N. J., assignor to United States Rubber Company, New York, N. Y., a corporation of New Jersey No Drawing. Application September 27, 1955
Serial No. 537,047

12 Claims. (Cl. 260—62)

This invention relates to a new method of the vulcanization of Butyl rubber by means of (A) certain phenolic compounds in conjunction with (B) heavy metal halides, and also to improved Butyl rubber vulcanizates made with such compounds.

According to the invention, Butyl rubber is vulcanized by heating with (A) a 2,6-di(acyloxymethyl)-4-hydrocarbylphenol of the formula

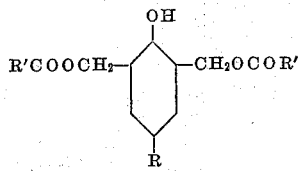

wherein R is a hydrocarbon radical (e. g., an alkyl, aryl, aralkyl or cycloalkyl radical) and R' is an alkyl, chloroalkyl or aryl radical, and R and R' preferably each contain 12 carbon atoms or less, and (B) a heavy metal halide. The resulting vulcanizates have remarkable resistance to oxidation and to exposure to elevated temperatures, and they have other desirable physical properties. It was surprising to find that the stated phenolic compounds, in the presence of heavy metal halides, will produce such improved Butyl rubber vulcanizates, because it has formerly been thought necessary to have methylol groups on the phenolic nucleus in order to vulcanize Butyl rubber. The unexpectedness of the results obtained with the present vulcanizing system is further emphasized by the fact that the described phenolic compound will not vulcanize Butyl rubber at any practical rate in the absence of the heavy metal halide. Butyl rubber cured by this new method is superior in several important properties to Butyl rubber cured by the corresponding dimethylol phenol and a metallic halide.

Butyl rubber, or GR–I, is a generic name for any of the well known synthetic rubbery copolymers of an isoolefin with a minor amount of a conjugated diolefin. The isoolefins used generally have from 4 to 7 carbon atoms, and such isomonoolefins as isobutylene and 2-methyl-2-butene are preferred. The diolefins used have from 4 to 8 carbon atoms. Isoprene and butadiene are the most important of these diolefins; others are piperylene; 2,3-dimethylbutadiene; 3-methyl-1,3-pentadiene; 2-methyl-1,3-pentadiene; 1,3-hexadiene and 2,4-hexadiene. The Butyl rubber typically contains from about 0.5 to 5%, and seldom more than 10%, of copolymerized diolefin on the total weight of the elastomer. This relatively small amount of unsaturation renders the behavior of Butyl rubber toward vulcanizing agents fundamentally different from the behavior of the more highly unsaturated rubbers, such as natural rubber or GR–S, and therefore experience with such highly unsaturated rubbers affords no basis for predicting the behavior of Butyl rubber toward a given vulcanizing agent.

Typical specific phenolic compounds employed in the invention are 2,6 - di(acetoxymethyl) - 4-methylphenol; 2,6 - di(acetoxymethyl) - 4 - ethylphenol; 2,6-di(acetoxymethyl) - 4 - isopropylphenol; 2,6 - di(acetoxymethyl)-4-tert-butylphenol; 2,6-di(acetoxymethyl)-4-tert,tert-octylphenol; 2,6 - di(acetoxymethyl)-4-dodecylphenol; 2,6-di(acetoxymethyl)-4-phenylphenol; 2,6-di(acetoxymethyl)-4-benzylphenol; 2,6-di(acetoxymethyl)-4-cyclohexylphenol; 2,6 - di(propionoxymethyl) - 4-tert-butylphenol; 2,6 - di(butyroxymethyl) - 4-tert-butylphenol; 2,6-di(lauroxymethyl) ₋ 4 - tert - butylphenol; 2,6-di(chloracetoxymethyl)-4-tert-butylphenol; and 2,6-di(benzoxymethyl)-4-tert-butylphenol.

The amount of phenolic compound employed in the invention usually ranges from about 1 part (by weight) to about 12 parts per 100 parts of the Butyl rubber. In general, a preferred range of phenol curing agent is from about 2 parts of 8 parts per 100 parts of the rubber.

The heavy metal halide—which may be regarded as a kind of catalyst or activator or curing supplement, since the phenolic material itself will not cure the Butyl rubber—is usually used in amount of at least 0.5 parts, and I preferably use about 1 to 3 parts, per 100 parts of the Butyl rubber. Although in some cases even larger amounts of the metal halide can be used, say 10 parts, it is not generally necessary or desirable to use appreciably more than about 5 parts. In the majority of cases I limit the heavy metal halide to 5 parts or less, and I may even limit it to 1 or 2 parts at times. I customarily use a large amount of the heavy metal halide, e. g., from 5 to 10 parts, when I wish to cure the Butyl very rapidly at a low temperature, e. g., 100° C.

The heavy metal halides employed are exemplified by such known stable acidic halides as tin chloride, zinc chloride, iron chloride, and, in general, halides of the various metals usually classified as heavy metals (cf. the periodic chart of the elements in "Introductory College Chemistry," by H. G. Deming, published by John Wiley and Sons, Inc). This class includes, inter alia, chromium chloride and nickel chloride, as well as cobalt chloride, manganese chloride and copper chloride. Although the copper halides may be used, I prefer not to use them because of the possibile deleterious effect of the copper on the Butyl rubber. The heavy metal chlorides constitute the preferred class of activators or vulcanization adjuvants, although the heavy metal salts of other halides including bromine, fluorine, and iodine (such as stannic iodide) may also be used. Of the heavy metal chlorides, the most preferred are those of tin, iron and zinc. The heavy metal halides are effective independently of the state of oxidation of the metal, and they are even effective if the halide is partially hydrolyzed, or is only a partial halide, as in zinc oxychloride.

In carrying out the invention, the Butyl rubber, phenolic compound, and heavy metal halide, and any additional desired ingredients, may be mixed together in any desired order according to the procedures ordinarily used in mixing rubber compounds, with the aid of the usual rubber mixing equipment, such as an internal mixer or roll mill.

The vulcanizable mixture resulting from the foregoing ingredients may be fabricated into the desired form by the usual methods, such as calendering, extrusion, or molding, and subsequently vulcanized by heating, preferably while confined under pressure.

Preferably carbon black is present in the products made by the process of this invention. As is well known, carbon black greatly improves the tensile strength, abrasion resistance and other properties of sulfur-cured Butyl rubber as compared to the respective properties of similarly cured gum Butyl rubber. This improvement likewise is conferred by carbon black on Butyl rubber which is cured by the method of this invention. However, for certain products this improved tensile strength, etc., is not needed. Therefore, in its broadest aspect this invention relates to the cure of gum Butyl rubber and to Butyl rubber which contains other fillers, e. g., clays, titanium dioxide, etc., as well as to black-filled Butyl rubber.

The cure is conveniently carried out at temperatures of 100° C. or more, and preferably at temperatures in excess of 150° C., for periods of time ranging from about 5 minutes to 3 hours, the longer periods of time within the stated time range being employed with the lower temperature. The most preferred curing temperatures are within the range of about 160° C. to 190° C., although somewhat higher temperatures may be employed, e. g., 200° to 205° C., provided that such high temperatures are not maintained long enough to cause thermal injury to the article. The time and temperature chosen for a particular cure not only are related inversely to each other but also are dependent on the amount of catalyst used. Therefore, the time and temperature of cure can be given only in the broad ranges shown above. Any skilled rubber compounder can easily determine conventionally the proper curing conditions for any particular stock.

The process of this invention is useful in making cured Butyl rubber products which resist aging at high temperatures in steam and/or air extremely well. Typical products are curing bags, steam hose, gaskets for equipment which must remain at high temperatures continuously or intermittently for long periods of time, belts, inner tubes, tires, motor mountings, flexible hot air ducts, hot water bottles, etc. The cured products may also be kept in contact with copper or silver articles, which would be tarnished by Butyl rubber products cured by, or containing, sulfur.

The following examples illustrate the practice of the invention. All parts and percentages are by weight.

EXAMPLE I

Preparation of the vulcanizing agents

Although forming per se no part of this invention, the preparation of typical phenolic materials employed in the invention will first be detailed, merely for purposes of illustration.

The present vulcanizing agents are made, in a reaction medium consisting essentially of a carboxylic acid, by metathetical reaction between an appropriate 2,6-di(halomethyl)-4-hydrocarbylphenol and a salt of the same carboxylic acid. The 2,6-di(halomethyl)-4-hydrocarbylphenol is made from the corresponding 2,6-dimethylol-4-hydrocarbylphenol and hydrogen halide.

Thus, 2,6-di(bromomethyl)-4-tert-butylphenol was first prepared as follows. Glacial acetic acid (630 parts) was saturated with dry hydrogen bromide at room temperature. 2,6-dimethylol-4-tert-butylphenol (210 parts) was added to the stirred solution, to which hydrogen bromide was also added continuously. The mixture was chilled in order to keep its temperature below about 50° C. Within a few minutes the exothermic reaction ended and white needles of the desired product began to form. Hydrogen bromide was shut off. The mixture was stirred at room temperature for a few minutes more in order to complete the crystallization. The 2,6-di-(bromomethyl)-4-tert-butylphenol was filtered. The filtrate was poured into 500 parts of water to precipitate a second crop of the product. Each crop was recrystallized from petroleum ether. The yield of recrystallized product was:

First crop, 138 parts, M. P. 97–99° C.  
Second crop, 82 parts, M. P. 97–98° C. } total yield 66%

Other typical 2,6-di(halomethyl) compounds made in the same way from the appropriate 2,6-dimethylol-4-substituted phenol and hydrogen halide in acetic acid, and useful in making the vulcanizing agents of this invention, are 2,6-di-(chloromethyl)-4-tert-butylphenol (crude product precipitated from AcOH with water and recrystallized from petroleum ether; M. P. 72–74°, yield 43%); 2,6-di(bromomethyl)-4-tert,tert-octylphenol (crude product precipitated with water and recrystallized from petroleum ether; M. P. 93–94°, yield 46%); and 2,6-di(bromomethyl)-4-methylphenol (crude product crystallized from AcOH; M. P. 114.5–115.5°, yield 67%; M. P. after recrystallization from a 40:60 mixture of benzene and petroleum ether, 119.0–119.5°).

The general method of making the vulcanizing agents of this invention is illustrated as follows.

2,6-di(bromomethyl)-4-tert-butylphenol (1245 parts) was added to a slurry of 640 parts (5% excess of theory) of sodium acetate in 3000 parts of glacial acetic acid at room temperature. A white precipitate of sodium bromide formed at once, and the sodium acetate dissolved. The mixture was stirred slowly for 3 hours, and then was poured into 12,000 parts of rapidly stirred water to precipitate 2,6-di(acetoxymethyl)-4-tert-butylphenol. The mixture was neutralized with solid sodium bicarbonate. The said phenol, a pale cream colored product, was filtered and washed well with water. The air-dried product weighed 1115 parts, and melted at 60–61° C. After recrystallization from petroleum ether it melted at 61–62° C., and was white.

This process is suitable for making all of the vulcanizing agents used in this invention. Therefore, for brevity only those minor portions of the process which differ from the above because of the individual properties of the products will be given in the following description of the preparation of other typical vulcanizing agents.

2,6-(diacetoxymethyl)-4-methylphenol (white, buttery solid, M. P. 35–36°; or supercooled oil, $n_D^{21}$ 1.5201).
Materials used:

| | Parts |
|---|---|
| 2,6-di(bromomethyl)-4-methylphenol | 442 |
| Sodium acetate | 270 |
| Glacial acetic acid | 1326 |
| Water | 5000 |
| Sodium bicarbonate to neutrality. | |

The sticky oil remaining after treatment with the NaHCO₃ was extracted with 900 parts of ether, the extract was dried over sodium sulfate, and the ether was evaporated in vacuo. Yield 332 parts of the said product. The oil gradually crystallized when kept at 10°.

2,6-di(acetoxymethyl)-4-tert,tert-octylphenol (very viscous yellow oil).
Materials used:

| | Parts |
|---|---|
| 2,6-di(bromomethyl)-4-tert,tert-octylphenol | 390 |
| Sodium acetate | 172 |
| Glacial acetic acid | 800 |
| Water | 3000 |
| Sodium bicarbonate to neutrality. | |

The oil remaining after treatment with the NaHCO₃ was treated like the 2,6-di(acetoxymethyl)-4-methylphenol, but crystallization could not be induced. Yield of 2,6-di(acetoxymethyl)-4-tert,tert-octylphenol was 300 parts.

ANALYSIS

| | Calcd. for $C_{20}H_{30}O_5$ | Found |
|---|---|---|
| Carbon percent | 68.6 | 68.9 |
| Hydrogen do | 8.0 | 8.8 |
| Saponification number | 320 | 316 |

2,6-di(benzoxymethyl)-4-tert-butylphenol (white crystals, M. P. 89°).

Materials used:

| | Parts |
|---|---|
| 2,6-di(bromomethyl)-4-tert-butylphenol | 33.6 |
| Sodium benzoate | 31.6 |
| Benzoic acid | 33.6 |
| Benzene | 90 |
| Water | 300–400 |

Sodium bicarbonate to neutrality.

A stirred mixture of the first three reagents was heated at 95–105° for 30 minutes to effect the desired reaction, the mixture was cooled somewhat, diluted with the benzene, poured into the water, neutralized, and the two layers separated. The oily layer was then allowed to evaporate at room temperature. The desired product gradually crystallized. After recrystallization from petroleum ether the yield was 21 parts, or 50% of theory.

2,6 - di(propionoxymethyl) - 4-tert-butylphenol (white crystals, M. P. 54.5–55.0°).

Materials used:

| | Parts |
|---|---|
| 2,6-di(bromomethyl)-4-tert-butylphenol | 336 |
| Sodium propionate | 390 |
| Propionic acid | 1000 |
| Water | 5000 |

Sodium bicarbonate to neutrality.

During neutralization the oily product solidified in the form of a large cake. The damp cake was dissolved in acetone, and the solution was filtered to remove a small amount of impurity which had been mechanically caught by the cake during solidification. The product then was reprecipitated by pouring the filtrate into water. The yield of the desired product, after recrystallization from petroleum ether, was 152.4 parts.

Materials used:

| | Parts |
|---|---|
| 2,6-di(bromomethyl)-4-tert-butylphenol | 168 |
| Sodium chloracetate | 295 |
| Chloracetic acid | 295 |
| Benzene | 650 |
| Water | 1000 |

Sodium bicarbonate to neutralize benzene layer.

A stirred mixture of the first three materials was heated at 50–55° for 30 minutes to effect the desired reaction. The mixture then was diluted with the benzene and poured into the water. The oily layer was separated and washed successively with water, aqueous sodium bicarbonate and water. The washed solution was dried over sodium sulfate and then was evaporated in vacuo. The residue was extracted with petroleum ether to remove impurities. The insoluble portion was recrystallized from cyclohexane to give 128.5 parts of the desired product.

EXAMPLE II

A masterbatch was mixed on a rubber mill in the proportion of 100 parts of GR–I 15 (a copolymer of isobutylene:isoprene, 98:2, according to Rubber Age, 74, 561 (1954)), 50 parts of carbon black, 2 parts of stearic acid and 5 parts of Indopol H300 (a commercially available polybutene sold as a plasticizer for rubbers). Stannous chloride dihydrate and the phenolic curing agent were then mixed with individual portions of the masterbatch on the mill to form a series of stocks which differed among themselves only in the amount of the curing agent. Portions of these stocks were cured in 6″ x 6″ x 0.1″ molds under pressure at 161° C. (322° F.) for the individual times shown. The stocks then were tested conventionally, as shown, to determine the extent of cure and resistance to aging.

| Stock | | 1 | 2 | 3 | 4 | 5 |
|---|---|---|---|---|---|---|
| Masterbatch | | 157 | 157 | 157 | 157 | 157 |
| SnCl$_2$.2H$_2$O | | 1.8 | 1.8 | 1.8 | 1.8 | 1.8 |
| 2,6-Di(acetoxymethyl)-4-tert-butylphenol | | 2 | 4 | 6 | 8 | 12 |
| Green Tests: | Cure (min.) | | | | | |
| Tensile Strength (p. s. i.) | 15 | 1,690 | 1,760 | 1,740 | 1,670 | 1,670 |
| | 30 | 1,840 | 1,650 | 1,560 | 1,620 | 1,520 |
| | 60 | 1,770 | 1,650 | 1,330 | 1,480 | 1,710 |
| | 120 | 1,890 | 1,670 | 1,530 | 1,450 | 1,610 |
| Elongation (percent) | 15 | 370 | 340 | 330 | 400 | 470 |
| | 30 | 340 | 260 | 230 | 250 | 340 |
| | 60 | 310 | 200 | 180 | 190 | 310 |
| | 120 | 300 | 200 | 130 | 160 | 240 |
| 200% Modulus (p. s. i.) | 15 | 660 | 770 | 890 | 650 | 510 |
| | 30 | 920 | 1,200 | 1,250 | 1,060 | 660 |
| | 60 | 910 | 1,490 | | 1,380 | 880 |
| | 120 | 930 | | | | 1,250 |
| Aging Tests (60-minute cures): | | | | | | |
| Tensile Strength (p. s. i.)— | | | | | | |
| green | | 1,770 | 1,650 | 1,330 | 1,480 | 1,710 |
| aged 3 days in steam[a] | | 1,800 | 1,420 | 1,250 | 1,340 | 1,490 |
| aged 24 hrs. in air[b] | | 1,390 | 1,370 | 1,160 | 1,210 | 1,160 |
| aged 48 hrs. in air | | 1,250 | 1,250 | 1,180 | 950 | 1,080 |
| Elongation (percent)— | | | | | | |
| green | | 310 | 200 | 180 | 190 | 310 |
| aged 3 days in steam | | 320 | 170 | 120 | 160 | 200 |
| aged 24 hrs. in air | | 330 | 150 | 120 | 100 | 90 |
| aged 48 hrs. in air | | 370 | 200 | 130 | 90 | 70 |
| 100% Modulus (p. s. i.)— | | | | | | |
| green | | 340 | 570 | 610 | 490 | 330 |
| aged 3 days in steam | | 350 | 590 | 750 | 660 | 550 |
| aged 24 hrs. in air | | 330 | 630 | 1,000 | 1,250 | |
| aged 48 hrs. in air | | 230 | 540 | 870 | | |

[a] All steam aging tests were made at 164° C. (85 p. s. i. of steam).
[b] All air aging tests were made at 177° C. with air circulating throughout the test.

2,6-di(chloracetoxymethyl)-4-tert-butylphenol (white, waxy solid, M. P. 46.0–46.5°).

This example shows that 2,6-di(acetoxymethyl)-4-tert-butylphenol is an excellent curing agent for Butyl rubber, and that the cured stocks age extremely well.

EXAMPLE III

The following stocks were mixed, cured and tested as shown in Example II.

| Stock | | 6 | 7 | 8 | 9 | 10 |
|---|---|---|---|---|---|---|
| Masterbatch (see Example II) | | 157 | 157 | 157 | 157 | 157 |
| SnCl₂.2H₂O | | 1.8 | 1.8 | 1.8 | 1.8 | 1.8 |
| 2,6-Di(acetoxymethyl)-4-tert,tert-octylphenol | | 2 | 4 | 6 | 8 | 12 |
| Green Tests: | Cure (min.) | | | | | |
| Tensile Strength (p. s. i.) | 15 | 1,490 | 1,680 | 1,730 | 1,650 | 1,710 |
| | 30 | 1,740 | 1,710 | 1,650 | 1,690 | 1,630 |
| | 60 | 1,740 | 1,660 | 1,380 | 1,570 | 1,540 |
| | 120 | 1,870 | 1,710 | 1,480 | 1,360 | 1,300 |
| Elongation (percent) | 15 | 510 | 450 | 440 | 410 | 470 |
| | 30 | 400 | 320 | 280 | 300 | 350 |
| | 60 | 370 | 220 | 170 | 200 | 260 |
| | 120 | 390 | 210 | 170 | 150 | 180 |
| 100% Modulus (p. s. i.) | 15 | 180 | 220 | 220 | 230 | 190 |
| | 30 | 220 | 330 | 330 | 340 | 250 |
| | 60 | 240 | 430 | 420 | 470 | 350 |
| | 120 | 240 | 480 | 660 | 750 | 520 |
| Aging Tests (60-minute cure): | | | | | | |
| Tensile Strength (p. s. i.)— | | | | | | |
| green | | 1,740 | 1,660 | 1,380 | 1,570 | 1,540 |
| aged 3 days in steam | | 1,640 | 1,750 | 1,210 | 1,070 | 1,100 |
| aged 24 hrs. in air | | 1,250 | 1,320 | 1,310 | 1,210 | 1,020 |
| aged 48 hrs. in air | | 1,070 | 1,190 | 1,030 | 1,020 | 950 |
| Elongation (percent)— | | | | | | |
| green | | 370 | 220 | 170 | 200 | 260 |
| aged 3 days in steam | | 350 | 240 | 130 | 140 | 140 |
| aged 24 hrs. in air | | 360 | 190 | 150 | 110 | 80 |
| aged 48 hrs. in air | | 390 | 210 | 140 | 110 | 90 |
| 100% Modulus (p. s. i.)— | | | | | | |
| green | | 230 | 430 | 420 | 470 | 350 |
| aged 3 days in steam | | 250 | 470 | 660 | 750 | 630 |
| aged 24 hrs. in air | | 200 | 440 | 710 | 1,100 | |
| aged 48 hrs. in air | | 210 | 400 | 700 | | |

This example shows that 2,6-di(acetoxymethyl)-4-tert,tert-octylphenol is an excellent curing agent for Butyl rubber, and that the cured stocks age extremely well.

EXAMPLE IV

The following stocks were mixed, cured and tested as shown in Example II.

| Stock | | 11 | 12 | 13 | 14 | 15 |
|---|---|---|---|---|---|---|
| Masterbatch (see Example II) | | 157 | 157 | 157 | 157 | 157 |
| SnCl₂.2H₂O | | 1.8 | 1.8 | 1.8 | 1.8 | 1.8 |
| 2,6-Di(acetoxymethyl)-4-methylphenol | | 2 | 4 | 6 | 8 | 12 |
| Green Tests: | Cure (min.) | | | | | |
| Tensile Strength (p. s. i.) | 15 | 1,080 | 1,300 | 1,280 | 1,270 | 1,250 |
| | 30 | 1,400 | 1,420 | 1,420 | 1,300 | 1,240 |
| | 60 | 1,590 | 1,430 | 1,290 | 1,270 | 1,250 |
| | 120 | 1,630 | 1,510 | 1,350 | 1,130 | 1,070 |
| Elongation (percent) | 15 | 430 | 460 | 410 | 410 | 430 |
| | 30 | 360 | 330 | 320 | 310 | 350 |
| | 60 | 310 | 240 | 220 | 230 | 280 |
| | 120 | 280 | 180 | 170 | 150 | 190 |
| 100% Modulus (p. s. i.) | 15 | 190 | 230 | 240 | 220 | 190 |
| | 30 | 250 | 280 | 290 | 280 | 230 |
| | 60 | 310 | 370 | 380 | 380 | 320 |
| | 120 | 390 | 520 | 610 | 540 | 440 |
| Aging Tests (60-minute cures): | | | | | | |
| Tensile Strength (p. s. i.)— | | | | | | |
| green | | 1,590 | 1,430 | 1,290 | 1,270 | 1,250 |
| aged 3 days in steam | | 1,620 | 1,520 | 1,310 | 1,180 | 1,160 |
| aged 24 hrs. in air | | 1,270 | 1,340 | 1,310 | 1,220 | 1,180 |
| aged 48 hrs. in air | | 1,040 | 1,110 | 1,000 | 890 | 960 |
| Elongation (percent)— | | | | | | |
| green | | 310 | 240 | 220 | 230 | 280 |
| aged 3 days in steam | | 300 | 210 | 160 | 170 | 190 |
| aged 24 hrs. in air | | 280 | 180 | 130 | 100 | 90 |
| aged 48 hrs. in air | | 250 | 140 | 100 | 80 | 70 |
| 100% Modulus (p. s. i.)— | | | | | | |
| green | | 310 | 370 | 380 | 380 | 320 |
| aged 3 days in steam | | 330 | 450 | 520 | 480 | 450 |
| aged 24 hrs. in air | | 310 | 590 | 910 | 1,100 | |
| aged 48 hrs. in air | | 270 | 550 | 850 | | |

This example shows that 2,6-di(acetoxymethyl)-4-methylphenol is an excellent curing agent for Butyl rubber, and that the cured stocks age well.

EXAMPLE V

The following stocks were mixed, cured and tested as shown in Example II.

| Stock | | 16 | 17 | 18 | 19 |
|---|---|---|---|---|---|
| Masterbatch (see Example II) | | 157 | 157 | 157 | 157 |
| SnCl₂.2H₂O | | 1.8 | 1.8 | 1.8 | 1.8 |
| 2,6-Di(propionoxymethyl)-4-tert-butylphenol | | 2 | 4 | 6 | 8 |
| Green Tests: | Cure (min.) | | | | |
| Tensile Strength (p. s. i.) | 15 | 1,370 | 1,720 | 1,720 | 1,710 |
| | 30 | 1,620 | 1,650 | 1,600 | 1,570 |
| | 60 | 1,630 | 1,570 | 1,430 | 1,510 |
| | 120 | 1,520 | 1,430 | 1,330 | 1,350 |
| Elongation (percent) | 15 | 490 | 380 | 390 | 380 |
| | 30 | 390 | 270 | 250 | 280 |
| | 60 | 350 | 200 | 170 | 210 |
| | 120 | 340 | 180 | 160 | 120 |
| 100% Modulus (p. s. i.) | 15 | 180 | 270 | 270 | 260 |
| | 30 | 240 | 380 | 380 | 350 |
| | 60 | 280 | 510 | 550 | 500 |
| | 120 | 280 | 580 | 770 | 760 |
| Aging Tests (60-minute cures): | | | | | |
| Tensile Strength (p. s. i.)— | | | | | |
| green | | 1,630 | 1,570 | 1,430 | 1,510 |
| aged 3 days in steam | | 1,720 | 1,580 | 1,240 | 1,230 |
| aged 24 hrs. in air | | 1,400 | 1,580 | 1,440 | 1,250 |
| aged 48 hrs. in air | | 1,210 | 1,460 | 1,280 | 1,390 |
| Elongation (percent)— | | | | | |
| green | | 350 | 200 | 170 | 210 |
| aged 3 days in steam | | 340 | 190 | 140 | 150 |
| aged 24 hrs. in air | | 340 | 190 | 120 | 100 |
| aged 48 hrs. in air | | 370 | 190 | 140 | 120 |
| 100% Modulus (p. s. i.)— | | | | | |
| green | | 280 | 510 | 550 | 500 |
| aged 3 days in steam | | 280 | 600 | 750 | 760 |
| aged 24 hrs. in air | | 260 | 600 | 980 | 1,210 |
| aged 48 hrs. in air | | 210 | 520 | 870 | 1,200 |

This example shows that 2,6-di(propionoxymethyl)-4-tert-butylphenol is an excellent curing agent for Butyl rubber, and that the cured stocks age extremely well.

EXAMPLE VI

The following stocks were mixed, cured and tested as shown in Example II.

| Stock | | 20 | 21 | 22 |
|---|---|---|---|---|
| Masterbatch (see Example II) | | 157 | 157 | 157 |
| SnCl₂.2H₂O | | 1.8 | 1.8 | 1.8 |
| 2,6-Di(benzoxymethyl)-4-tert-butylphenol | | 4 | 6 | 8 |
| Green Tests: | Cure (min.) | | | |
| Tensile Strength (p. s. i.) | 15 | 1,610 | 1,590 | 1,700 |
| | 30 | 1,830 | 1,660 | 1,660 |
| | 60 | 1,660 | 1,700 | 1,690 |
| | 120 | 1,660 | 1,690 | 1,740 |
| Elongation (percent) | 15 | 440 | 430 | 410 |
| | 30 | 350 | 320 | 290 |
| | 60 | 280 | 260 | 240 |
| | 120 | 250 | 200 | 180 |
| 100% Modulus (p. s. i.) | 15 | 230 | 280 | 250 |
| | 30 | 290 | 300 | 300 |
| | 60 | 380 | 430 | 420 |
| | 120 | 380 | 530 | 670 |
| Aging Tests (60-minute cures): | | | | |
| Tensile Strength (p. s. i.)— | | | | |
| green | | 1,660 | 1,700 | 1,690 |
| aged 3 days in steam | | 1,490 | 1,490 | 1,230 |
| aged 24 hrs. in air | | 1,220 | 1,260 | 1,300 |
| aged 48 hrs. in air | | 1,070 | 1,140 | 1,150 |
| Elongation (percent)— | | | | |
| green | | 280 | 260 | 240 |
| aged 3 days in steam | | 240 | 190 | 150 |
| aged 24 hrs. in air | | 240 | 150 | 130 |
| aged 48 hrs. in air | | 280 | 190 | 140 |
| 100% Modulus (p. s. i.)— | | | | |
| green | | 380 | 430 | 420 |
| aged 3 days in steam | | 400 | 550 | 570 |
| aged 24 hrs. in air | | 330 | 500 | 740 |
| aged 48 hrs. in air | | 280 | 450 | 650 |

This example shows that 2,6-di(benzoxymethyl)-4-tert-butylphenol is an excellent curing agent for Butyl rubber, and that the cured stocks age extremely well.

EXAMPLE VII

The following stocks were mixed, cured and tested as shown in Example II.

| Stock | | 23 | 24 |
|---|---|---|---|
| Masterbatch (see Example II) | | 157 | 157 |
| SnCl₂.2H₂O | | | 1.8 |
| 2,6-Di(chloracetoxymethyl)-4-tert-butylphenol | | 5 | 5 |
| Green Tests: | Cure (min.) | | |
| Tensile Strength (p. s. i.) | 15 | 80 | 1,580 |
| | 30 | 230 | 1,530 |
| | 60 | 590 | 1,430 |
| | 120 | 1,110 | 1,320 |
| Elongation (percent) | 15 | 910 | 340 |
| | 30 | 830 | 250 |
| | 60 | 650 | 220 |
| | 120 | 490 | 190 |
| 100% Modulus (p. s. i.) | 15 | 90 | 330 |
| | 30 | 120 | 450 |
| | 60 | 150 | 570 |
| | 120 | 220 | 590 |
| Aging Tests (60-minute cures): | | | |
| Tensile Strength (p. s. i.)— | | | |
| green | | 590 | 1,430 |
| aged 24 hrs. in air | | 940 | 1,010 |
| Elongation (percent)— | | | |
| green | | 650 | 220 |
| aged 24 hrs. in air | | 300 | 180 |
| 100% Modulus (p. s. i.)— | | | |
| green | | 150 | 570 |
| aged 24 hrs. in air | | 270 | 480 |

This example shows that the metal halide must be present in order for 2,6-di(chloracetoxymethyl)-4-tert-butylphenol to effect rapid cure of Butyl rubber. The cured stock 24—which illustrates this invention—ages well.

EXAMPLE VIII

The following stocks were mixed, cured and tested as shown in Example II.

| Stock | 25 | 26 | 27 | 28 | 29 |
|---|---|---|---|---|---|
| Masterbatch (see Example II) | 157 | 157 | 157 | 157 | 157 |
| 2,6-Di(acetoxymethyl)-4-tert-butylphenol | 6 | 5 | 5 | 5 | 5 |
| SnCl$_2$.2H$_2$O | | *2.25 | | | |
| ZnCl$_2$ | | | *1.36 | | |
| FeCl$_3$.6H$_2$O | | | | *2.7 | |
| SbCl$_3$ | | | | | *2.28 |

| Green Tests: | Cure (min.) | | | | | |
|---|---|---|---|---|---|---|
| Tensile Strength (p. s. i.) | 15 | | 1,580 | 290 | 1,500 | 960 |
| | 30 | 100 | 1,530 | 480 | 1,500 | 1,150 |
| | 60 | 110 | 1,460 | 610 | 1,590 | 1,280 |
| | 120 | 400 | 1,480 | 730 | 1,520 | 1,410 |
| Elongation (percent) | 15 | | 380 | 530 | 360 | 400 |
| | 30 | 1,250 | 220 | 420 | 310 | 330 |
| | 60 | 1,020 | 180 | 380 | 340 | 310 |
| | 120 | 810 | 150 | 300 | 290 | 310 |
| 100% Modulus | 15 | | 300 | 130 | 290 | 230 |
| | 30 | 70 | 430 | 170 | 290 | 300 |
| | 60 | 90 | 580 | 200 | 350 | 350 |
| | 120 | 160 | 710 | 250 | 390 | 390 |

*Equimolar amounts.

This example shows that the metal halide is needed to effect cure of Butyl rubber by 2,6-di(acetoxymethyl)-4-tert-butylphenol. Stocks 26–29 are adequately cured, and illustrate this invention.

Having thus described my invention, what I claim and desire to protect by Letters Patent is:

1. A method of vulcanizing a synthetic rubbery copolymer of an isoolefin having from 4 to 7 carbon atoms with from 0.5 to 10% of a conjugated diolefin having from 4 to 8 carbon atoms, comprising heating 100 parts by weight of the said rubber at a temperature of from 100° C. to 205° C. for from 5 minutes to 3 hours, in admixture with from 1 to 12 parts of a phenolic compound of the formula

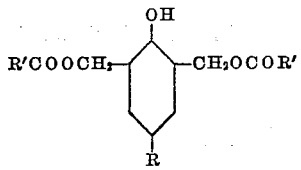

wherein R is a radical selected from the group consisting of alkyl, aryl, aralkyl and cycloalkyl radicals and R' is a radical selected from the group consisting of alkyl, chloroalkyl and aryl radicals, and from 0.5 to 10 parts of a heavy metal halide.

2. A method of vulcanizing a synthetic rubbery copolymer of isobutylene with from 0.5 to 10% of isoprene, comprising heating 100 parts by weight of said rubber at a temperature of from 150° C. to 205° C. for from 5 minutes to 3 hours, in admixture with from 2 to 8 parts of 2,6-di(acetoxymethyl)-4-tert-butylphenol and from 1 to 5 parts of a heavy metal chloride.

3. A method of vulcanizing a synthetic rubbery copolymer of isobutylene with from 0.5 to 10% of isoprene, comprising heating 100 parts by weight of said rubber at a temperature of from 150° C. to 205° C. for from 5 minutes to 3 hours, in admixture with from 2 to 8 parts of 2,6 - di(acetoxymethyl) - 4-tert,tert.-octylphenol and from 1 to 5 parts of a heavy metal chloride.

4. A method of vulcanizing a synthetic rubbery copolymer of isobutylene with from 0.5 to 10% of isoprene, comprising heating 100 parts by weight of said rubber at a temperature of from 150° C. to 205° C. for from 5 minutes to 3 hours, in admixture with from 2 to 8 parts of 2,6-di(acetoxymethyl)-4-methylphenol and from 1 to 5 parts of a heavy metal chloride.

5. A method of vulcanizing a synthetic rubbery copolymer of isobutylene with from 0.5 to 10% of isoprene, comprising heating 100 parts by weight of said rubber at a temperature of from 150° C. to 205° C. for from 5 minutes to 3 hours, in admixture with from 2 to 8 parts of 2,6-di(propionoxymethyl)-4-tert-butylphenol and from 1 to 5 parts of a heavy metal chloride.

6. A method of vulcanizing a synthetic rubbery copolymer of isobutylene with from 0.5 to 10% of isoprene, comprising heating 100 parts by weight of said rubber at a temperature of from 150° C. to 205° C. for from 5 minutes to 3 hours, in admixture with from 2 to 8 parts of 2,6-di(benzoxymethyl)-4-tert-butylphenol and from 1 to 5 parts of a heavy metal chloride.

7. An improved vulcanizate characterized by resistance to deterioration at elevated temperatures comprising 100 parts by weight of a synthetic rubbery copolymer of an isoolefin having from 4 to 7 carbon atoms with from 0.5 to 10% of a conjugated diolefin having from 4 to 8 carbon atoms, vulcanized with from 1 to 12 parts of a phenolic compound of the formula

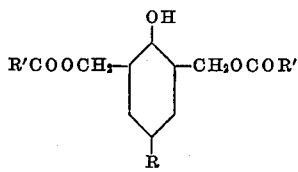

wherein R is a radical selected from the group consisting of alkyl, aryl, aralkyl and cycloalkyl radicals and R' is a radical selected from the group consisting of alkyl, chloroalkyl and aryl radicals, and from 0.5 to 100 parts of a heavy metal halide.

8. An improved vulcanizate characterized by resistance to oxidation at elevated temperatures comprising 100 parts by weight of a synthetic rubbery copolymer of isobutylene with from 0.5 to 10% of isoprene, vulcanized with from 2 to 8 parts of 2,6-di(acetoxymethyl)-4-tert-butylphenol and from 1 to 5 parts of a heavy metal chloride.

9. An improved vulcanizate characterized by resistance to oxidation at elevated temperatures comprising 100 parts by weight of a synthetic rubbery copolymer of isobutylene with from 0.5 to 10% of isoprene, vulcanized with from 2 to 9 parts of 2,6-di(acetoxymethyl)-4-tert,tert-octylphenol and from 1 to 5 parts of a heavy metal chloride.

10. An improved vulcanizate characterized by resistance to oxidation at elevated temperatures comprising 100 parts by weight of a synthetic rubbery copolymer of isobutylene with from 0.5 to 10% of isoprene, vulcanized with from 2 to 8 parts of 2,6-di(acetoxymethyl)-4-methylphenol and from 1 to 5 parts of a heavy metal chloride.

11. An improved vulcanizate characterized by resistance to oxidation at elevated temperatures comprising 100 parts by weight of a synthetic rubbery copolymer of isobutylene with from 0.5 to 10% of isoprene, vulcanized with from 2 to 8 parts of 2,6-di(propionoxymethyl)-4-tert-butylphenol and from 1 to 5 parts of a heavy metal chloride.

12. An improved vulcanizate characterized by resistance to oxidation at elevated temperatures comprising 100 parts by weight of a synthetic rubbery copolymer of isobutylene with from 0.5 to 10% of isoprene, vulcanized with from 2 to 8 parts of 2,6-di(benzoxymethyl)-4-tert-butylphenol and from 1 to 5 parts of a heavy metal chloride.

References Cited in the file of this patent

UNITED STATES PATENTS 2,726,224     Peterson et al.            Dec. 6, 1955

OTHER REFERENCES

Van der Meer: Rubber Chem. Tech., 18, 853–873 (1945).